May 8, 1962
R. A. WHITE
3,032,878
DENTAL HANDPIECE CONTROL
Filed March 14, 1960
2 Sheets-Sheet 2
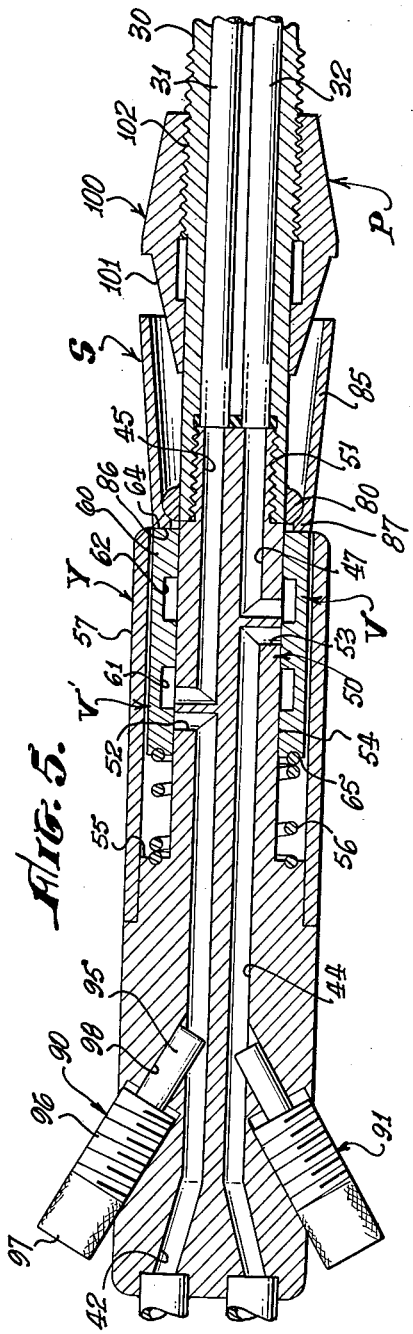
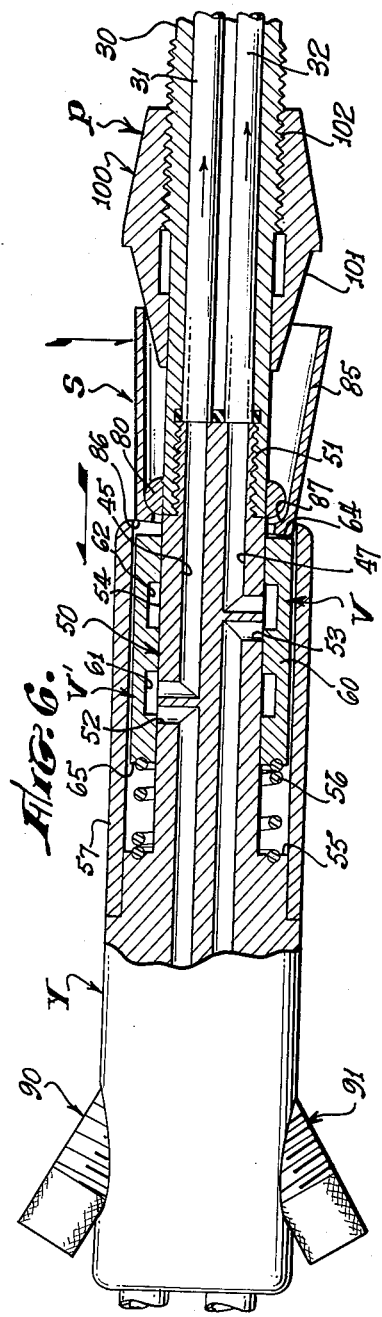
INVENTOR.
RAYMOND A. WHITE,
BY
AGENT.

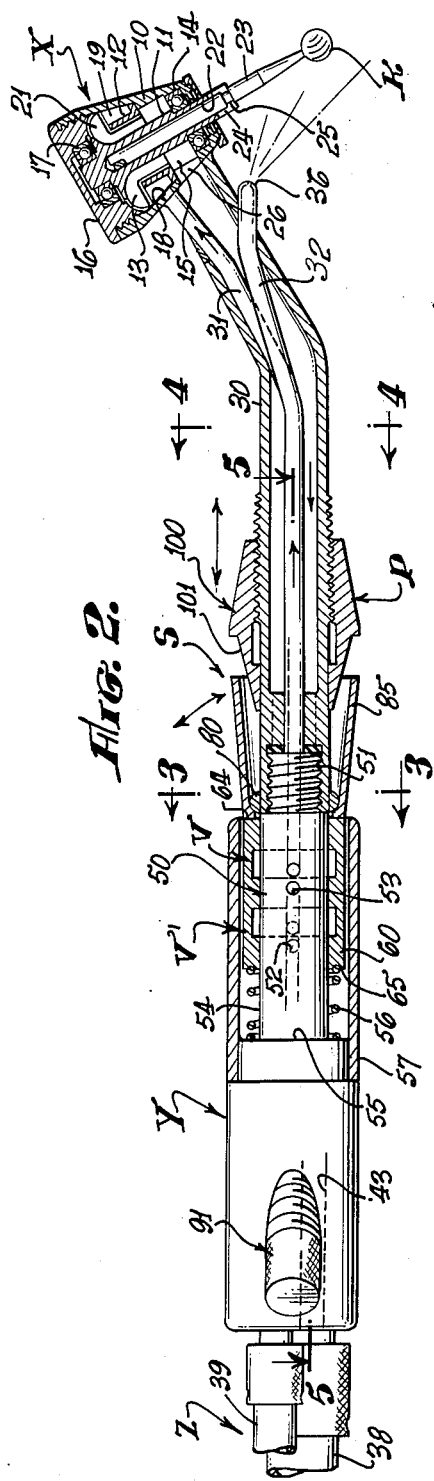

3,032,878
DENTAL HANDPIECE CONTROL
Raymond A. White, 615 W. 9th St., San Pedro, Calif.
Filed Mar. 14, 1960, Ser. No. 14,612
16 Claims. (Cl. 32—27)

This invention relates to a dental handpiece or hand-tool and is particularly concerned with a handpiece control that lends itself to facility of manipulation in order to throttle and/or control the speed of operation of the drive motor of the handpiece, it being a general object of this invention to provide a compact and reliable control in a self-contained dental handpiece and which is adapted to accurately control the speed and general operation of the drive motor thereof.

Handpieces for dentistry are made with the drive motor incorporated therein, in which case power or energy is conducted to the handpiece and is utilized in the said handpiece to drive the rotating elements thereof. The particular handpiece under consideration may be driven as by fluids under pressure, either gas or a liquid and involves a manually operable control therefor. The handpiece is held in the hand of the user, that is, it is held in the hand of the dentist, and it is controlled completely by said dentist's hand. More specifically, the starting and stopping of the motor is controlled as well as the throttling thereof or the speed of rotation thereof, and further, other fluids are controlled, as for example, coolants in the form of water or air or water mist.

It is an object of this invention to provide an improved handpiece for use in dentistry that incorporates therein the control means therefor after the teaching of my Letters Patent 2,928,174 entitled Dental Handpiece and Control Therefor, issued March 15, 1960. With the structure that I now provide, the single hand of the user is not only employed to manipulate the handpiece, but the controlling valve means is directly positioned and operated by a shiftable element positioned by the hand.

It is still another object of this invention to provide a handpiece as above set forth wherein the throttling valve, or other controlling valves, are incorporated in the body construction to control flow of operating fluids.

It is also an object of this invention to provide a handpiece as above set forth wherein the manually operable control element is depressible universally from any position surrounding the body of the handpiece and to provide in cooperation therewith an adjustable stop means adapted to selectively limit the amount of depression of said element.

Further, it is an object of this invention to provide a compact self-contained dental handpiece having the drive therefor and that includes the control and also the valving for the operating fluids used in dentistry processes, all incorporated in the body structure in a most practical and advantageous manner.

The various objects and features of my invention will be fully understood from the following detailed description of a typical preferred form and application of my invention, throughout which description reference is made to the accompanying drawings, in which:

FIG. 1 is a perspective view of the handpiece showing the manner in which it is manipulated. FIG. 2 is an enlarged longitudinal sectional view taken as indicated by line 2—2 on FIG. 1. FIGS. 3 and 4 are enlarged transverse sections taken as indicated by lines 3—3 and 4—4 on FIG. 2. FIGS. 5 and 6 are enlarged detailed plan sections, FIG. 5 being taken as indicated by line 5—5 on FIG. 2, and FIG. 6 being a view similar to FIG. 5 and showing movement of the parts.

The drive for the handpiece is incorporated in the head X thereof in the manner set forth and claimed in my copending application for Letters Patent Serial No. 588,757, entitled Turbine Driven Dental Handpiece.

In the particular construction illustrated the handpiece is of the "contra angle" type wherein the axis of the head X is at an angle to the axis of the handpiece body Y. Further, the power or energy for driving the rotating elements is conducted to the body Y and head X through a fluid supply means Z. In addition to the above mentioned head X, body Y and fluid supply means Z, the handpiece is characterized by a manually operable control S adapted to be manipulated by the fingers of the hand used to hold and support the handpiece.

The driving head X, as best illustrated in FIG. 2 of the drawings, is a drive unit or prime mover and involves, generally, a case 10, a shaft 11 rotatably carried in the case to project from one end thereof, a stator 12 fixed in the case to receive and direct fluid handled by the driving head X, and a rotor 13 preferably integral with the shaft 11 to receive fluid directed by the stator and adapted to rotate the shaft.

The case 10 is an elongate shell-like part with a cone-shaped outer wall tapered inwardly toward the lower end thereof. A seat is provided at the lower end of the case 10 to carry an anti-friction bearing 14, and a shoulder is provided intermediate the ends of the case 10 to support the stator 12 in the case. Intermediate the bearing 14 and stator 12 there is an exhausting chamber 15 defined by the wall of the case 10 and surrounding the shaft 11. A cover 16 closes the top of the case 10 and has a seat to carry an anti-friction bearing 17. The bearings 14 and 17 rotatably support the shaft 11 within the case 10, the lower end of the shaft 11 projecting somewhat from the bottom of the case.

The stator 12 receives fluid under pressure, preferably air or the like, through a port 18 in the wall of the case 10. The stator 12 is characterized by an annular chamber 19 defined by the wall of the case 10 and an inner wall of the stator 12. Fluid received by the stator 12 is directed upwardly through vanes that are carried thereby, said vanes being in a continuous annular series.

The rotor 13 receives fluid directed upwardly by the stator 12 and is adapted to handle the fluid so that it is conducted inwardly and downwardly imparting driving force to the rotor 13. The rotor 13 is preferably integral with the shaft 11 and has a continuous annular series of blades 21. The stator vanes and blades 21 are suitably pitched, in the direction of rotation, and as circumstances require, in order to gain the desired speed of rotation, etc.

The head X is employed to drive a cutter K, for example, a burr cutter, as shown. The shaft 11 has a straight bore 22 entering the lower end thereof to slidably receive the shank 23 of the cutter. The upper end of the cutter shank 23 is notched to engage with a key in the bore 22. In order to retain the cutter K in working position, I may provide a friction exerting or detent-type collet at the lower end portion of the shaft 11. For example, the lower end portion of the shaft 11 is split at 24 and provided with inward projections that engage in a groove 25 in the shank 23.

In operation, fluid used to drive the rotor is received from the lower end of the rotor by the exhausting chamber 15, and it is directed from the chamber through an enlarged exhaust port 26 in the side wall of the case 10 (see FIG. 2).

The body Y, in accordance with the preferred form of the invention, is a multi-tubular element adapted to conduct fluids to and from the head X. That is, the body Y involves a plurality of fluid conducting passages, it being understood that the said body can be made from one solid piece of material or fabricated from separate tubular elements. As shown, the body Y is a combination of the two constructions, the rear portion being of solid construction and the front portion being of fabricated tubular construction.

The front portion of the body Y involves, an outer case 30 and one or more inner tubes housed within the case 30. In the particular case illustrated there is an inner tube 31 adapted to conduct fluid under pressure to the inlet port 18 in the head X, and an inner tube 32 adapted to conduct fluid coolant to the vicinity of the head X. The outer case 30 is of substantial cross sectional configuration and is adapted to receive exhaust fluid from the port 26 in the head X. As shown, the case 30 is round with a flow passage extending coextensively therethrough and opening at both the front and rear ends of the case.

In accordance with the invention, the outer case 30 is flattened at the forward end portion thereof, in a horizontal plane, to be coextensive with the height and width of the exhaust port 26. The port 26 is coextensive with the inner diameter of the case 10 and the side walls of the case 30 are tangent to the walls of the case 10 (see FIG. 4). The forward end of the case 30 is suitably-shaped and the head X secured thereto as by brazing, or the like. It will be observed that the forward portion of the case 30 may be gradually flattened, and that it may be upturned, as shown, to form a "contra angle" handpiece.

The inlet port 18 is located in the head X immediately above the exhaust port 26, and is substantially smaller than the port 25. The inner tube 31 is considerably smaller in diameter than the outer case 30 and extends longitudinally of the interior of the case. The inner tube 31 is provided to conduct fluid under pressure for operation of the driving head X and extends longitudinally of the interior of the case. The inner tube 32 is provided to conduct a coolant, or the like, to the vicinity of the head X and extends to a suitable tip that has a jet 36 to direct fluid coolant in the area of the cutter K.

The fluid supply means Z, as clearly shown in the drawings, is provided to handle the passage of fluids to and from the head X of the handpiece. That is, the means Z handles the flow of compressed air to the inner tube 31 and it handles exhaust air from the interior of the outer case 30, and it handles coolant to the inner tube 32. The means Z involves, generally, the rear end portion of the body Y and fluid connections including a fluid pressure supply line 37, an exhaust line 38, and coolant supply line 39. The body Y has passages 42, 43 and 44 that communicate with the lines 37, 38 and 39, respectively and which communicate with corresponding passages 45, a continuation of passage 43 and 47 in the body Y.

In accordance with the invention, the body Y has the controlling valves incorporated therein, there being a throttling valve V and a coolant supply valve V', to be operated simultaneously. As hereinabove pointed out, the body Y is sectional in that it has front and rear portions, the front portion being of fabricated tubular construction and the rear portion being of solid construction. The said rear portion of the body Y comprises a valve seat 50 that is encompassed or surrounded by a valve element 60. The valve seat 50 serves as the frame and fluid conducting element of this portion of the structure and the surrounding valve element 60 serves as the controlling element that is positioned by the control S, later described.

The valve seat 50 that is provided to act as a frame element and to conduct fluid is elongate and extends along the longitudinal axis of the body Y. The seat 50 is preferably machined from solid material, as above indicated, and it is joined to the front case 30 by means of a releasable screw thread connection at 51. The fluid handling lines 37, 38 and 39 are coupled to the terminal rear end of the seat 50 in communication with the passages 42, 43 and 44 as above specified, and said passages extend or are disposed longitudinal through the valve seat 50, preferably parallel with each other and with the said longitudinal axis.

The passage 42 handles the higher pressured fluid supply for operating the driving head X and is, therefore, of relatively small cross section, and it is a drilled hole that extends to one end portion of the seat 50, preferably the forward end, where it communicates with a laterally opening aperture 52. The passage 43 handles the lower pressured exhaust fluid to be discharged from the handpiece and is, therefore, of relatively large cross section, and it is a drilled hole, or the like that extends coextensively through the seat 50, thereby communicating with the interior of the case 30 so as to exhaust through the line 38. The passage 44 handles the coolant, preferably water, under nominal pressure, and is, therefore, of relatively small cross section, and it is a drilled hole that extends to the other end portion of the seat, namely the rear end thereof, where it communicates with the laterally opening aperture 53. Note that the apertures 52 and 53 are longitudinally spaced and open lateral of the body element or seat 50.

The passages 42 and 44 are for the inlet of fluid and they are associated, respectively, with corresponding outlet passages 45 and 47 that direct the fluid forwardly through the valve seat to the tubes 31 and 32, respectively. As is clearly shown, the passages 45 and 47 can be aligned with their corresponding passages 42 and 44, however they are not in direct communication therewith. As shown, there are also corresponding outlet apertures associated with the apertures 52 and 53 respectively, said outlet apertures opening laterally of the passages 45 and 47, respectively. The pairs of apertures can be disposed side by side, although they can be rotatively displaced, as is shown. Thus, there are two pairs of apertures, one pair for handling the inlet or air under pressure and the other of water under pressure.

Although the seat 50 can vary in its specific design and construction, it is preferred that it be a cylindrical element for cooperative relationshsip with the parts and elements of the control S, later described, and for ease of manufacture and simplicity of assembly. As is clearly illustrated, the seat 50 has a cylindrical outer wall 54 that is machined smooth and adapted to slidably receive and carry the valve element 60. These parts can be lapped for a close fit. The seat 50 is essentially a straight cylindrical element turned on one diameter, and it is stepped at its rear end to form an abutment or shoulder 55 to seat a return spring 56. The spring 56 is a compression spring that presses forwardly and it is protected with a tubular shield 57 carried on the enlarged rear end portion of the seat 50 and extending forwardly to overlie the said spring and valve element 60.

The valve element 60 is preferably a sleeve-shaped element, since the valve seat is preferably cylindrical in form. As shown, the valve element 60 is tubular in form and surrounds the valve seat 50 and is machined to fit closely onto the valve seat with freedom for longitudinal movement, it being incidental that said valve element is also rotatable on said seat. The valve element 60, in accordance with the invention, is recessed at 61 and 62, at its forward and rear portions, for controlling flow of fluid from the passages 42 and 44, respectively. The recesses 61 and 62 are annular in form and turned into the inner diameter of the sleeve-shaped valve element 60, each being of substantial longitudinal extent in order for each to span the apertures of the pair of apertures involved. As is indicated, the valve element 60 is urged by the spring 56 to a forward normally unactuated position where the recesses 61 and 62 are forward of the pressure supply inlet apertures 52 and 53, and it is operable toward a fully operated position where the recesses 61 and 62 overlie the apertures 52 and 53. The opposite ends 64 and 65 of the valve element 60 are flat and normal to the axis thereof, the end 64 being engaged by the control means S, later described, and the end 65 being engaged by the spring 56.

The present invention is characterized by the control S that I provide for actuating the valves V and V' in order to admit fluids to the head X of the handpiece. In accordance with the invention the control S is adapted to be operated by any one or more of the fingers of the hand supporting the structure and involves, generally, a fulcrum and a lever. Further, the means S includes the selectively adjustable stop means P for engaging the lever and limiting movement thereof.

The fulcrum may be a simple pivot, however, in accordance with the preferred form of the invention it is a circular element that extends continuously around the body Y of the handpiece. As illustrated in FIGS. 2 and 3 of the drawings, the fulcrum is in the form of a ring 80 engaged over and projecting from the outer wall of the body Y, and it may be secured in place as by brazing or the like. As shown, the outer wall of the ring 80 is curved about a radius to have bearing engagement with the lever, as hereinafter described.

The lever may be a simple pivoted lever, however, in accordance with the invention it is a circular element that surrounds the body Y to be manually engageable at any point or position around the body. As illustrated in FIGS. 2 and 3, the lever is in the form of a collar 85 that encircles the body Y with some clearance therebetween. The inner wall of the collar 85 is larger in diameter than the body Y and engages over the ring 80 that forms the fulcrum. A flange 87 extends inwardly at the rear end portion of the collar 85 and is provided with a flat rearwardly disposed operating face 86 and with a curved annular seat that has bearing engagement with the matching curved wall of the ring 80. Both the said wall and the said seat are continuous annular parts that are adapted to have bearing contact with each other at any point around the structure. Further, the collar 85 is flared somewhat outwardly as it extends forward in order to increase the pivotal movement thereof.

By depressing the forward end portion of the collar 85 inwardly, at any point around the circumference thereof, the flange 87 is rocked, from its normally transverse plane normal to the axis of the handpiece, so that the peripheral part thereof diametrically opposite the pivot point is moved axially rearward. It will be apparent that depression of the collar 85 at any point will rock the flange 87 and will cause maximum rearward motion at a point on the operating face 86 diametrically opposite the pivot point. The said operating face 86 is normally in flat engagement with the end 64 of the valve element 60, and when the lever is depressed, as above set forth, the end 64 of the valve element is directly engaged and said element shifted rearwardly.

The stop means P that I provide involves an abutment 100 that is selectively positioned on the body Y forward of the lever. The abutment 100 is a circular part that surrounds the body Y and has a conical face 101 at the rear end thereof that is engageable with the forward end of the lever. The abutment 100 is adapted to be shifted and positioned longitudinally of the body Y to engage the lever so that the lever cannot be depressed beyond a predetermined limit, and it is adapted to be shifted and positioned forwardly to clear the lever, if so desired, so as not to interfere with the movement thereof. It is preferred that the abutment 100 be threadedly engaged on the body Y at 102 and manually rotatable thereon so that it can be selectively positioned fore and aft, as circumstances require.

In some instances it is advisable to establish a limited supply of fluid under pressure, either the operating fluid for the driving head X or the coolant fluid for spraying. Therefore, I provide a control valve 90 to determine maximum flow through the passage 45 and a control valve 91 to determine maximum flow through the passage 47. In practice, the two valves 90 and 91 can be identical, each involving a valve plug 95, a threaded stem 96 and a manually rotatable head 97. The valve plug 95 is operable in an angularly disposed bore 98 that intersects the passage 45 or 47, as the case may be, so that said passage is blocked depending upon the position of the plug as controlled by the threaded stem that is manually operable to position the plug. Thus, flow of fluid through the passages 45 and 47 can be readily restricted as circumstances require.

From the foregoing it will be apparent that I have provided an improved and very practical dental handpiece in which the drive and control is completely self-contained and controlled entirely by the single hand of the user. It is merely necessary to couple the handpiece to suitable fluid supply lines, preferably flexible supply lines, whereupon the device is ready for operation. The operation of the structure involved is clearly set forth above, the selectively adjustable stop means P operating to limit the depression of the lever and consequently limit the longitudinal shifting of the valve element 60. The single valve element that is operated by the single lever controls the handpiece and its driving head X.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A fluid operated dental handpiece including, an elongate body, a cutter driving fluid operated head at the forward end of the body, a fulcrum intermediate the ends of the body, a lever pivoted on the fulcrum, and a valve sleeve shiftably carried over the body and engaged by the lever and actuated thereby controlling operation of the driving head.

2. A fluid operated dental handpiece including, an elongate cylindrical body, a cutter driving fluid operated head at the forward end of the body, a fulcrum intermediate the ends of the body, a lever pivoted on the fulcrum, and a valve sleeve shiftably surrounding the body and having an end engaged by the lever and actuated thereby controlling operation of the driving head.

3. A fluid operated dental handpiece including, an elongate body with a fluid inlet port extending longitudinally therein and in communication with an aperture opening at the side of the body, a cutter driving fluid operated head at the forward end of the body, a fulcrum intermediate the ends of the body, a lever pivoted on the fulcrum, and a valve element shiftably carried on the body and having a recess to communicate with the aperture and engaged by the lever and actuated thereby to control the opening of the aperture into said recess to operate the driving head.

4. A fluid operated dental handpiece including, an elongate cylindrical body with a fluid inlet port extending longitudinally therein and in communication with an aperture opening at the side of the body, a cutter driving fluid operated head at the forward end of the body, a fulcrum intermediate the ends of the body, a lever pivoted on the fulcrum, and a valve sleeve shiftably carried on the body and having an annular recess to communicate with the aperture and engaged by the lever and actuated thereby to control the opening of the aperture into said recess to operate the driving head.

5. A fluid operated dental handpiece including, an elongate cylindrical body with a fluid inlet port extending longitudinally therein and in communication with an aperture opening at the side of the body, a cutter driving fluid operated head at the forward end of the body, a fulcrum intermediate the ends of the body, a lever pivoted on the fulcrum, and a valve sleeve shiftably carried on the body and having an annular recess to communicate with the aperture and having an end engaged by the lever and actuated thereby to control the opening of the aperture into said recess to operate the driving head.

6. A fluid operated dental handpiece including, an elongate body with a plurality of fluid inlet ports extending longitudinally therein and each in communication with an aperture opening at the side of the body, a cutter driving fluid operated head at the forward end of the body, a fulcrum intermediate the ends of the body, a lever pivoted on the fulcrum, and a valve element shiftably carried on the body and having a plurality of recesses and one for each of said apertures and engaged by the lever and actuated thereby to control the opening of the apertures into said recesses to pass fluid to the driving head.

7. A fluid operated dental handpiece including, an elongate cylindrical body with a plurality of fluid inlet ports extending longitudinally therein and each in communication with an aperture opening at the side of the body, a fulcrum intermediate the ends of the body, a lever pivoted on the fulcrum, a cutter driving fluid operated head at the forward end of the body, and a valve sleeve shiftably carried on the body and having a plurality of annular recesses and one for each of said apertures and engaged by the lever and actuated thereby to control the opening of the apertures into said recesses to pass fluid to the driving head.

8. A fluid operated dental handpiece including, an elongate cylindrical body with a plurality of fluid inlet ports extending longitudinally therein and each in communication with an aperture opening at the side of the body, a fulcrum intermediate the ends of the body, a lever pivoted on the fulcrum, a cutter driving fluid operated head at the forward end of the body, and a valve sleeve shiftably carried on the body and having a plurality of annular recesses and one for each of said apertures and having an end engaged by the lever and actuated thereby to control the opening of the apertures into said recesses to pass fluid to the driving head.

9. A fluid operated dental handpiece including, an elongate body with a pair of fluid inlet ports extending longitudinally therein and each in communication with an aperture opening at the side of the body, said apertures being spaced longitudinally of the body, a fulcrum intermediate the ends of the body, a lever pivoted on the fulcrum, and a valve element shiftably carried on the body and having a pair of recesses and one at each end portion thereof and one for each of said apertures and engaged by the lever and actuated thereby to control the opening of the apertures into said recesses to pass fluid to the driving head.

10. A fluid operated dental handpiece including, an elongate cylindrical body with a pair of fluid inlet ports extending longitudinally therein and each in communication with an aperture opening at the side of the body, said apertures being spaced longitudinally of the body, a fulcrum intermediate the ends of the body, a lever pivoted on the fulcrum, and a valve sleeve shiftably carried on the body and having a pair of annular recesses and one at each end portion thereof and one for each of said apertures and engaged by the lever and actuated thereby to control the opening of the apertures into said recesses to pass fluid to the driving head.

11. A fluid operated dental handpiece including, an elongate cylindrical body with a pair of fluid inlet ports extending longitudinally therein and each in communication with an aperture opening at the side of the body, said apertures being spaced longitudinally of the body, a fulcrum intermediate the ends of the body, a lever pivoted on the fulcrum, and a valve sleeve shiftably carried on the body and having a pair of annular recesses and one at each end portion thereof and one for each of said apertures and having an end engaged by the lever and actuated thereby to control the opening of the apertures into said recesses to pass fluid to the driving head.

12. A fluid operated dental handpiece including, an elongate body with a fluid inlet port extending longitudinally therein and in communication with an aperture opening at the side of the body and a fluid exhaust port extending therethrough, a cutter driving fluid operated head at the forward end of the body, a fulcrum intermediate the ends of the body, a lever pivoted on the fulcrum, and a valve element shiftably carried on the body and having a recess to communicate with the aperture and engaged by the lever and actuated thereby to control the opening of the aperture into said recess to operate the driving head, said driving head exhausting fluid through said exhaust port.

13. A fluid operated dental handpiece including, an elongate body with a plurality of fluid inlet ports extending longitudinally therein and each in communication with an aperture opening at the side of the body and a fluid exhaust port extending therethrough, a cutter driving fluid operated head at the forward end of the body, a fulcrum intermediate the ends of the body, a lever pivoted on the fulcrum, and a valve element shiftably carried on the body and having a plurality of recesses and one for each of said apertures and engaged by the lever and actuated thereby to control the opening of the apertures into said recesses to pass fluid to the driving head, said driving head exhausting fluid through said exhaust port.

14. A fluid operated dental handpiece including, an elongate tubular body, a cutter driving fluid operated head at the forward end of the body, a ring surrounding the body intermediate the ends thereof, a collar engaged over the body with clearance therebetween and having a flange at one end thereof adapted to have bearing engagement with the ring, an operated element shiftably carried by the body and engaged by the collar to be shifted when the collar is depressed laterally toward the body, and a selectively positioned stop to limit depression of the collar.

15. A fluid operated dental handpiece including, an elongate tubular body, a cutter driving fluid operated head at the forward end of the body, a ring surrounding the body intermediate the ends thereof, a collar engaged over the body with clearance therebetween and having a flange at one end thereof adapted to have bearing engagement with the ring, an operated element shiftably carried by the body and engaged by the collar to be shifted when the collar is depressed laterally toward the body, and a selectively positioned stop with an inclined face to limit depression of the collar.

16. A fluid operated dental handpiece including, an elongate tubular body, a cutter driving fluid operated head at the forward end of the body, a ring surrounding the body intermediate the ends thereof, a collar engaged over the body with clearance therebetween and having a flange at one end thereof adapted to have bearing engagement with the ring, an operated element shiftably carried by the body and engaged by the collar to be shifted when the collar is depressed laterally toward the body, and a manually rotatable stop threadedly carried on the body and selectively positioned to limit depression of the collar.

References Cited in the file of this patent

UNITED STATES PATENTS

| | | |
|---|---|---|
| 2,276,748 | Thompson | Mar. 17, 1942 |
| 2,664,632 | Norlen | Jan. 5, 1954 |
| 2,799,934 | Kern | July 23, 1957 |